Patented July 5, 1927.

1,634,473

UNITED STATES PATENT OFFICE.

LYNNE H. ULICH, OF RACINE, AND ROBERT J. GOODRICH, OF SOUTH MILWAUKEE, WISCONSIN, ASSIGNORS TO THE NEWPORT COMPANY, OF MILWAUKEE, WISCONSIN, A CORPORATION OF DELAWARE.

PROCESS OF MAKING N-DIHYDRO-1-2-2'-1'-ANTHRAQUINONEAZINE.

No Drawing.    Application filed April 4, 1925. Serial No. 20,618.

This invention relates to coloring matters or intermediates of the anthracene series and a process of making the same, more particularly to a process of making N-dihydro 1:2:2':1'-anthraquinone azine, known as indanthrene, or its homologs or derivatives.

Heretofore, indanthrene has generally been made by the alkali fusion of 2-aminoanthraquinone in the presence of an oxidizing agent. The products of the reaction are greatly influenced by the temperature at which the fusion is carried out. Fusions below 250° C., or if in the absence of an oxidizing agent, yield appreciable quantities of alizarine, which is very undesirable. Between 250° and 290° C., the alizarine formed is largely converted into benzoic acid, pyrocatechuic acid and other soluble acids. Above 290° C., particularly between 300° and 350° C., some flavanthrene is formed. And at all of the above-mentioned temperatures, considerable decomposition of the 2-aminoanthraquinone takes place with the formation of anthraquinone and ammonia and other decomposition products. To purify the crude indanthrene obtained from such a fusion, it is necessary to dissolve it in alkaline hydrosulfite at a certain temperature and then cool it to a point where the leuco body of indanthrene crystallizes out and may be filtered off, leaving the impurities in the mother liquor.

The present invention has for its object a simple method for obtaining a high yield of indanthrene, its homologs or derivatives, in a relatively high degree of purity and in such condition that it may be used directly for dyeing from the hydrosulfite vat.

Other and further important objects of this invention will be apparent from the disclosures in the following description, which sets forth the preferred form of our invention.

Our invention is essentially one of dehalogenization and consists in heating the halogen derivatives of N-dihydro 1:2:2':1'-anthraquinone azine and homologs and derivatives thereof with alcoholic potash, with or without the presence of a dissolving or diluting agent and with or without a catalyzer. Various dehalogenating agents may be used in place of alcoholic potash and also various halogenated derivatives of N-dihydro 1:2:2':1'-anthraquinone azine. But we prefer to carry out the reaction with dibrom N-dihydro 1:2:2':1'-anthraquinone azine. This may be obtained by the condensation of 1:3 dibrom 2-aminoanthraquinone or by any other suitable method. As the number of side reactions occuring during the dehalogenization process are very few, a high yield of the product is obtained. And further the indanthrene is obtained directly in a relatively high degree of purity and may be used directly for dyeing from the hydrosulfite vat.

The following example will serve to further illustrate the procedure, but the invention is not limited to this example, as any halogenated N-dihydro 1:2:2':1'-anthraquinone azine body and any suitable dehalogenizing agent may be used:

Example: Add 100 parts by weight of dibrom N-dihydro 1:2:2':1'-anthraquinone azine to a previously prepared solution of 200 parts by weight of caustic potash and 400 parts by weight of denatured alcohol. Reflux gently for one hour and then gradually distill off the alcohol, the temperature rising to 115° C. Reflux at this temperature for one hour. Pour the reaction mass into 2000 parts by weight of cold water and precipitate the dyestuff with a current of air. When precipitation is complete, filter and wash with water until free of inorganic salts.

We are aware that numerous details of the process may be varied through a wide range without departing from the spirit of this invention, and we therefore do not purpose limiting the patent granted, otherwise than as necessitated by the prior art.

We claim as our invention:

1. The process of producing a coloring matter of the anthracene series, which consists in heating dibrom N-dihydro 1:2:2':1'-anthraquinone azine with alcoholic potash to form N-dihydro 1:2:2':1'-anthraquinone azine.

2. The process of producing a coloring matter of the anthracene series, which consists in heating a halogenated N-dihydro 1:2:2':1'-anthraquinone azine body with a dehalogenizing agent to form a N-dihydro 1:2:2′:1′-anthraquinone azine body by the replacement of the halogen atoms by hydrogen atoms.

3. The process of producing a coloring matter of the anthracene series, which consist in heating a halogenated N-dihydro-1:2:2′:1′-anthraquinone azine with alcoholic potash to form N-dihydro 1:2:2′:1′-anthraquinone azine.

In testimony whereof, we have hereunto subscribed our names.

LYNNE H. ULICH.
ROBERT J. GOODRICH.